…

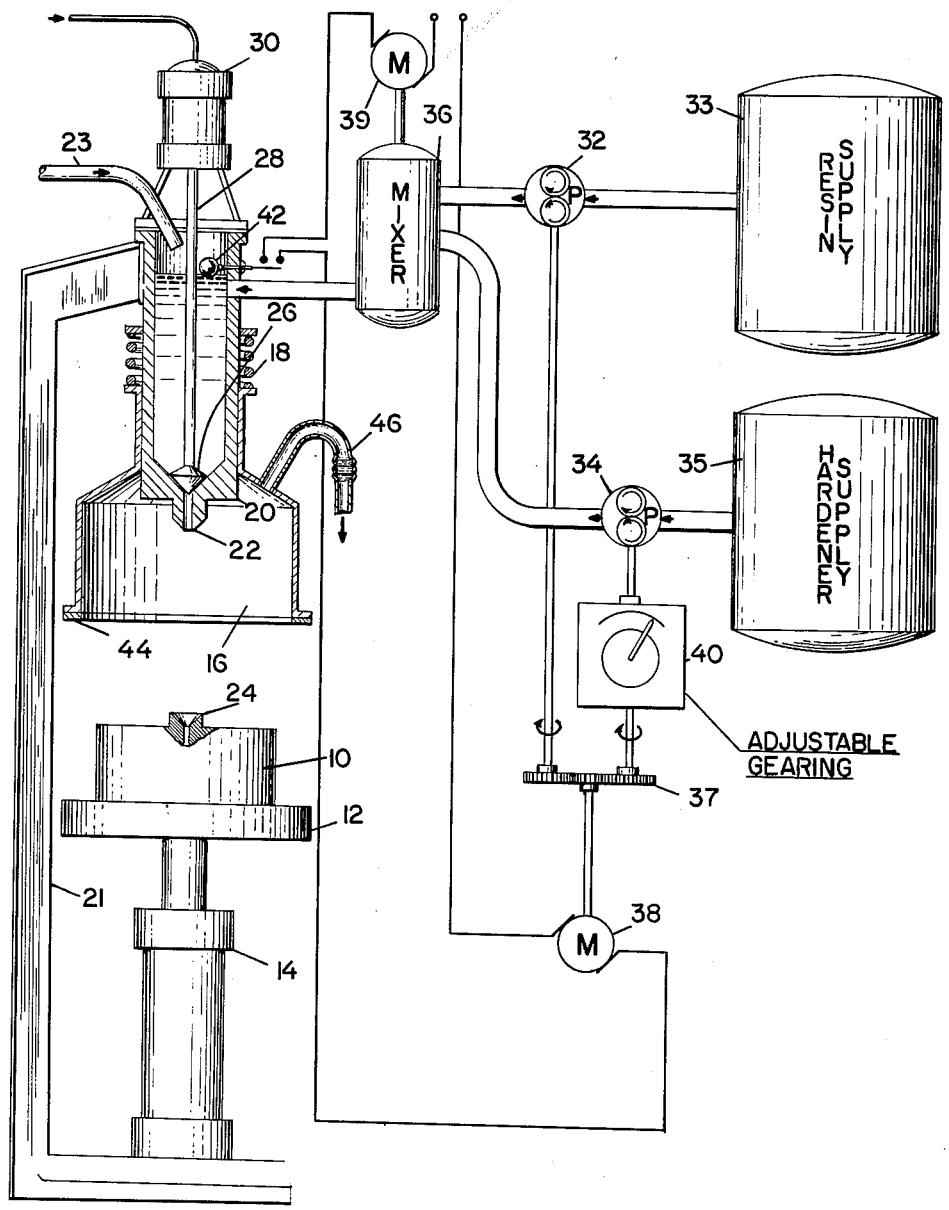

United States Patent Office 3,154,618
Patented Oct. 27, 1964

3,154,618
METHOD OF AND APPARATUS FOR EFFECTING A SUCCESSION OF PRESSURE CASTING OPERATIONS WITH CASTABLE RESINS
Heinz Baer and Paul Kolaczek, Weingarten, Germany, and Edwin Denz, Neuallschwil, Switzerland, assignors to Josef Baer, Maschinenfabrik, Weingarten, Germany, a German firm
Filed Jan. 19, 1961, Ser. No. 83,760
7 Claims. (Cl. 264—299)

The present invention relates to a method of and an apparatus for the pressure casting of castable resins that harden in the presence of a hardener.

The pressure casting method has proved to be extremely advantageous in the quantity production of articles made of castable resins that harden in the presence of a hardener and also for casting around or into articles. In this method, the mould may, if desired, be evacuated, and the castable resin, which is already mixed with the hardener, is injected into the mould under pressure. The pressure is produced, for example, by subjecting the surface of the resin to pressure in a small supply vessel, the mouth of which is engaged with the sprue of the mould during the casting operation. In order to obtain rapid filling of the mould (high fluidity of the casting resin) and rapid hardening, that is to say, a rapid succession of the casting operations, the resin is heated to a higher temperature. This, however, has the drawback, that it shortens the life of the resin-hardener mixture.

The present invention provides a method of carrying out a succession of pressure casting operations with a mixture of a castable resin and a hardener therefor, wherein the mixture is charged under pressure at each casting operation into a mould from a supply vessel containing a predetermined quantity of the mixture in excess of that required for each casting operation; the resin and hardener are separately fed in controlled relative proportions to a mixing device from which the mixture is fed to the supply vessel, and the separate feeding of the resin and hardener to the mixing device and the feeding of the mixture to the supply vessel are automatically brought into or out of operation when the quantity of the mixture in the supply vessel falls below or reaches, respectively, the said predetermined quantity. The charging of the resin-hardener mixture under pressure into the mould may be assisted by evacuating the mould.

The invention also provides apparatus for carrying out the above method, which comprises a supply vessel for charging the resin-hardener mixture into a mould, a mixing device communicating with the supply vessel, separate feeding means for feeding the resin and the hardener separately to the mixing device in controlled relative proportions, driving means for operating the mixing device and the said feeding means, and measuring means for determining the quantity of mixture in the supply vessel and bringing into or out of operation the said driving means when the said quantity of mixture falls below or reaches, respectively, the predetermined quantity.

An example of the apparatus of the invention is shown partly in elevation and partly diagrammatically in the accompanying drawing.

A casting mould 10 for an article to be moulded is located on a table 12 carried by a lifting device, for example, a compressed air cylinder 14. Above the mould 10 there is a vacuum bell 16 which is slidably mounted on the exterior of a cylindrical supply vessel 20 and is upwardly slidable in opposition to the action of a spring 18. The lifting cylinder 14 and the supply vessel 20 are arranged on a common frame 21. The supply vessel is provided at its lower end with an outlet cone 22 which fits into a sprue funnel 24 of the mould 10. Communicating with the upper part of the supply vessel is a gas-pressure conduit 23 by means of which pressure can be applied to the surface of the castable resin in the supply vessel. The outlet 22 of the vessel can be closed by a cone valve 26 which is actuated through a valve stem 28 by means of a compressed air cylinder 30. The supply vessel 20 contains the mixture of castable resin and hardener which is to be cast.

The resin-hardener mixture is fed into the supply vessel 20 by means of an automatically operated apparatus for mixing the casting resin and hardener in predetermined proportions and feeding the mixture into the vessel 20. This apparatus comprises a metering pump 32 for the resin, another metering pump 34 for the hardener, a mixing device 36 driven by a motor 39 for the materials supplied by the two metering pumps, and supply vessels 33 and 35 for resin and hardener respectively. The two metering pumps 32 and 34 are driven by a common motor 38 which drives the two pumps through any desired gearing, which, as shown in the drawing, is a reduction gearing 37, and an adjustable gearing 40 having a variable transmission ratio is provided in the drive of the metering pump 34 for the hardener. The operation of the motor 38 and thereby the two metering pumps, and of the mixing device 36, is controlled by means of a switch 42 which is operated by changes in level of the mixture in the supply vessel 20.

The apparatus operates as follows: An empty casting mould 10 is placed on the table 12 when the latter is in the lowered position (as shown in the drawing). When the casting process is started, either manually or automatically, the table 12 with the casting mould 10 are first moved upwards by the pressure cylinder 14. The table 12 first makes contact with the rim of the bell 16, which rim is provided with an elastic seal 44 that forms a gas-tight connection between the bell 16 and the table 12.

The vacuum chamber thus formed by the table and the bell is evacuated through a vacuum conduit 46. At the same time, the table continues to move upwards until the sprue funnel 24 makes contact with the outlet cone 22. The table remains in this position, the pressure in the cylinder 14 maintaining a good seal between the sprue funnel and the outlet cone. When the vacuum has reached the required value, the filling of the mould is started by opening the cone valve 26. The pressure exerted on the surface of the resin in the vessel through the conduit 23 forces the resin into the mould until the latter is filled. After atmospheric pressure has been established in the vacuum chamber within the bell, either manually or automatically, the table is moved downwards. The filled casting mould is replaced by a fresh mould and a new casting operation can be started. The mould filled with resin is allowed to stand to permit hardening of the resin or, in the case of a thermo-setting resin the mould is placed in an oven. The moulded article is kept in the mould until the resin has hardened completely or at least until the article can be removed from the mould without any risk of subsequent change in shape. Single or multiple casting moulds may be used. In this way by using a number of moulds corresponding to the hardening time uninterrupted production can be achieved.

The quantity of the mixture fed to the supply vessel 20 is independent of the quantity thereof charged into a mould at each casting operation. As soon as the surface of the resin-hardener mixture in the supply vessel 20 falls below a predetermined level the switch 42 sets the motors 38 and 39 in operation. The two metering pumps deliver resin and hardener in relative proportions which can be adjusted as desired by means of the variable gearing 40. The mixing device 36 delivers the homogeneous resin-hardener mixture to the supply vessel 20 until the predetermined level has been reached therein, whereby the switch 42 is turned off.

In this manner there is constantly maintained in the supply vessel 20 a quantity of mixture which is at least somewhat greater than that required to fill a mould. The refilling of the supply vessel is then completely independent of the quantity of the mixture charged into a mould at each casting operation. This is particularly important when the resin mixture is to be cast around the exterior of and/or in the interior of an article with the mould, casting for example, an electric coil, winding, condenser, resistor, etc., because the volume around or within the article to be filled varies within certain limits from article to article, so that the quantity of the resin mixture required varies. If a fixed metered quantity of the mixture were fed to the supply vessel at each casting operation, the supply vessel would be empty or overflow in the course of time, since the variations in the capacities of the moulds would not generally cancel out. The apparatus of the present invention also has the advantage that only the minimum quantity of casting resin and hardener is mixed at any time. If, for example, the apparatus is stopped unexpectedly only an insignificant quantity of the resin is wasted. This is important, since, as is known, the resin-hardener mixture, when once prepared, hardens out and cannot be re-melted like thermoplastic materials.

The casting is carried out under a relatively low pressure, which generally does not exceed a few atmospheres. Having regard to this low pressure, the moulds may be very simple and cheap and may, for example, consist of a plastic, which considerably reduced their cost.

The pressure exerted on the casting resin mixture contained in the supply vessel during casting can be made to suit the requirements of the casting operation and the casting mould. Under certain conditions, the pressure may be reduced almost to zero, provided it is sufficient to force the resin mixture into the mould.

The invention is, of course, not limited to the embodiment illustrated in the drawing. This, for example, instead of using a common driving motor, separate driving motors may be provided for the two metering pumps 32 and 34, the relative speeds of which motors are so adjusted that the desired mixing proportions are obtained.

What is claimed is:

1. A method of carrying out a succession of pressure casting operations with a resin-hardener mixture, comprising the steps of charging the mixture under pressure at each casting operation into a mould from a supply vessel containing a predetermined quantity of the mixture slightly in excess of that required for each casting operation, feeding separately the resin and hardener in controlled relative proportions to a mixing device, feeding the mixture thus obtained to the supply vessel, and bringing automatically into or out of operation the separate feeding of the resin and hardener to the mixing device and the feeding of the mixture to the supply vessel when the quantity of the mixture in the supply vessel falls below or reaches, respectively, the said predetermined quantity, said predetermined quantity being independent of that used in the casting operation.

2. Apparatus for effecting a succession of pressure casting operations which comprises a supply vessel for charging the resin-hardener mixture into a mould, a mixing device communicating with the supply vessel, separate feeding means for feeding the resin and the hardener separately to the mixing device in controlled relative proportions, driving means for operating the mixing device and the said feeding means, and measuring means for determining the quantity of mixture in the supply vessel and bringing into or out of operation the said driving means when the said quantity of mixture falls below or reaches, respectively, the predetermined quantity.

3. Apparatus as claimed in claim 2, wherein the supply vessel has a mould-charging outlet that communicates with a dome-shaped member, and a support for a mould is movably mounted for gas-tight engagement with the dome-shaped member to form with the latter a vacuum chamber having a connection for evacuating the chamber.

4. Apparatus as claimed in claim 3, wherein the support takes the form of a vertically reciprocable table to support a mould having a sprue funnel, the table is upwardly movable to make a gas-tight connection with the lower edge of the dome-shaped member, and the latter is upwardly movable against the action of a spring to permit engagement of the sprue funnel with the charging outlet of the supply vessel during further upward movement of the table.

5. Apparatus for effecting a succession of pressure casting operations which comprises a supply vessel for charging the resin-hardener mixture into a mold of determined volume, a mixing device communicating with the supply vessel, separate feeding means for feeding the resin and the hardener separately to the mixing device in controlled relative proportions, driving means for operating the mixing device and the said feeding means, and measuring and control means for controlling the quantity of mixture in the supply vessel and bringing into or out of operation the said driving means when the said quantity of mixture falls below or reaches, respectively, a predetermined quantity of mixture, in the supply vessel, which only slightly exceeds the volume of the mold to be charged, said predetermined quantity being independent of that used in the casting operation.

6. Apparatus for effecting a succession of pressure casting operations which comprises molds to be charged having volumes varying within a higher limit value and a lower limit value, a supply vessel for charging the resin-hardener mixture into one of said molds at a time, a mixing device communicating with the supply vessel, separate feeding means for feeding the resin and the hardener separately to the mixing device in controlled relative proportions, driving means for operating the mixing device and the said feeding means, and measuring and control means for controlling the quantity of mixture in the supply vessel and bringing into or out of operation the said driving means when the said quantity of mixture falls below or reaches, respectively, a predetermined quantity of mixture in the supply vessel only slightly exceeding said higher limit value of the mold volume, said predetermined quantity being independent of that used in the casting operation.

7. Apparatus for pressure casting operations wherein a resin-hardener mixture is pressure cast into a number of molds having slightly varying volumina to be filled with said mixture, comprising:

(1) a storage vessel for resin,
(2) a storage vessel for hardener,
(3) a mixer comprising means for mixing said resin and hardener therein,
(4) conduit means connecting said resin and said hardener storage vessel, respectively, to said mixer,
(5) valve means for controlling the flow of resin and hardener, respectively, through said conduit means to said mixer,
(6) a supply vessel for storing a determined amount of resin-hardener mixture, said amount being independent of that used in the casting operation,
(7) conduit means for feeding resin-hardener mixture from said mixer to said supply vessel,
(8) discharge means provided in said supply vessel operable to discharge resin-hardener mixture from said supply vessel into one of said molds at a time,
(9) float means in the upper part of the interior of said supply vessel, adapted for floatingly engaging the surface of the resin-hardener mixture in said supply vessel to be raised and lowered in unison therewith,
(10) an electric control circuit adapted for controlling the operation of said valve means and of said mixing means,

(11) make and break contact means in said circuit; said float means being adapted to engage said contact means to break circuit when the surface of the resin-hardener mixture in said supply vessel rises above a determined level, and to make contact when said surface drops below said determined level, thereby causing said valve means to admit resin and hardener to said mixer and causing said mixing means to mix said resin and said hardener therein, said mixer and said conduit means connecting said mixer with said supply vessel being so positioned relative to the latter that substantially the entire amount of the resulting mixture flows from said mixer into said supply vessel before the surface of the mixture in the supply vessel reaches said predetermined level and causes said float means to break circuit via said contact means.

References Cited in the file of this patent

UNITED STATES PATENTS

| | | |
|---|---|---|
| 2,461,723 | Cowan | Feb. 15, 1949 |
| 2,673,723 | Keen | Mar. 30, 1954 |
| 2,692,923 | Ash | Oct. 26, 1954 |
| 2,862,239 | Pollard et al. | Dec. 2, 1958 |
| 2,885,728 | Campbell | May 12, 1959 |
| 2,892,214 | McCarthy | June 30, 1959 |
| 3,001,234 | Renier | Sept. 26, 1961 |